O. JOHNSON.
AIR BRAKE APPARATUS.
APPLICATION FILED SEPT. 25, 1913.
1,191,187.
Patented July 18, 1916.
2 SHEETS—SHEET 1.
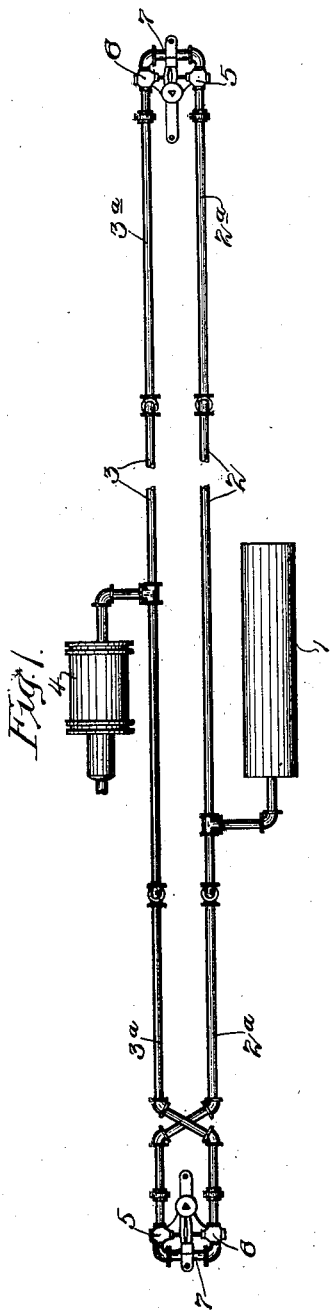
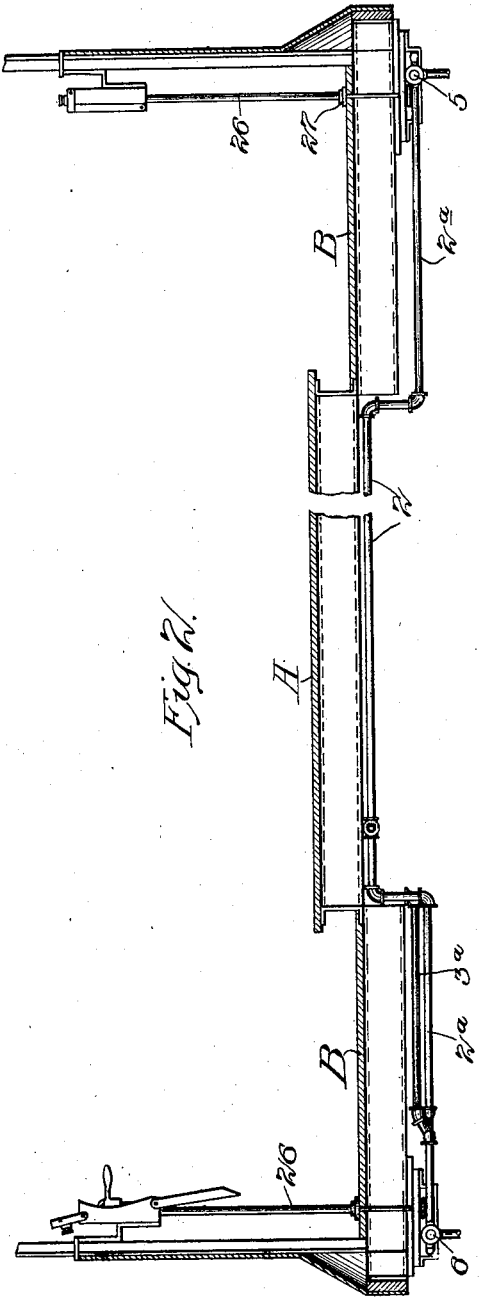
Witnesses:
Arthur Haegg.
George L Chindahl
Inventor:
Oscar Johnson.
By Luther L Miller
Attorney.

O. JOHNSON.
AIR BRAKE APPARATUS.
APPLICATION FILED SEPT. 25, 1913.
1,191,187.
Patented July 18, 1916.
2 SHEETS—SHEET 2.
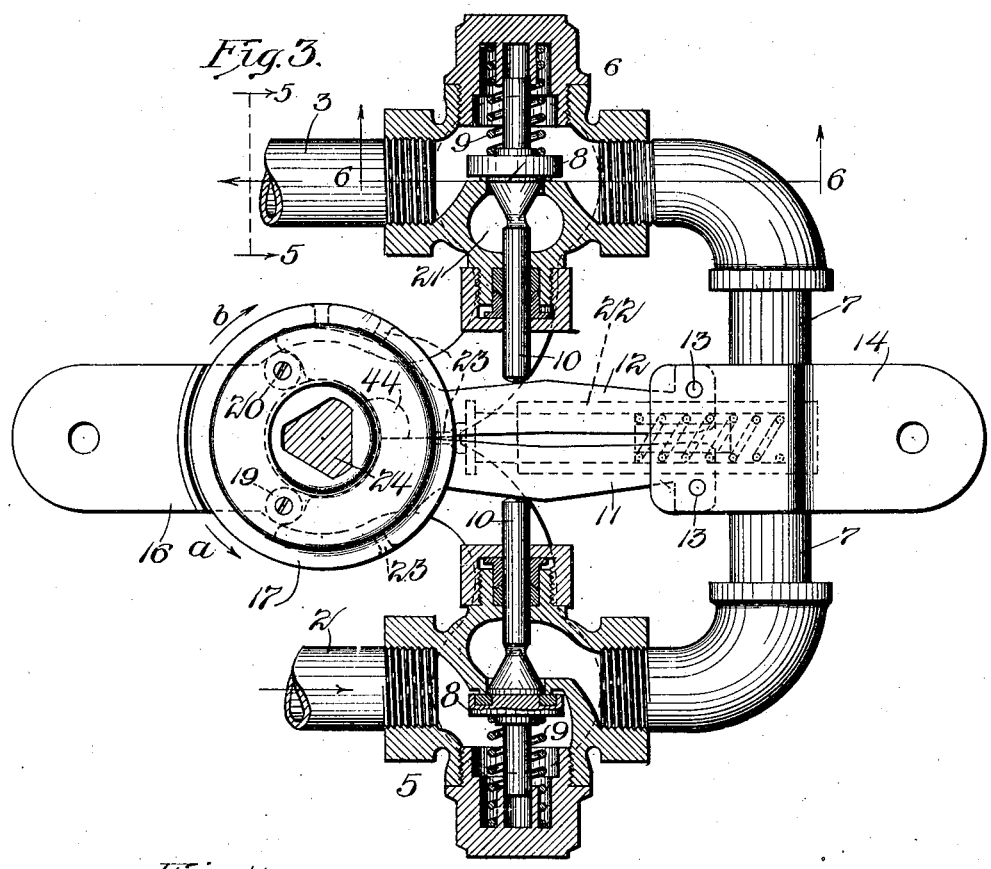
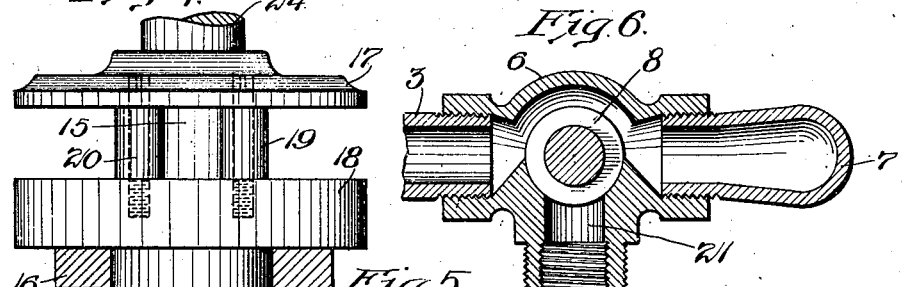
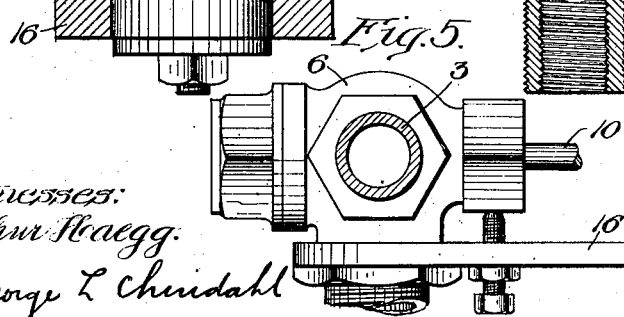
Witnesses:
Arthur Bragg.
George L. Chundahl.
Inventor:
Oscar Johnson.
By Luther L. Miller
Attorney.

UNITED STATES PATENT OFFICE.

OSCAR JOHNSON, OF CHICAGO, ILLINOIS.

AIR-BRAKE APPARATUS.

1,191,187.   Specification of Letters Patent.   Patented July 18, 1916.

Application filed September 25, 1913. Serial No. 791,687.

*To all whom it may concern:*

Be it known that I, OSCAR JOHNSON, a citizen of the United States, residing at Chicago, in the county of Cook and State of Illinois, have invented certain new and useful Improvements in Air-Brake Apparatus, of which the following is a specification.

In street cars and similar vehicles the platform at each end of the car body is usually located beneath the horizontal plane of the floor of the car body. The reservoir line and the train line extend longitudinally of the car body and the platforms, those portions of said pipes which extend beneath the platforms being lower than the portions that extend beneath the car body. The flow of air into and out of the train line is controlled by means of a motorman's brake valve located in each vestibule at a height convenient for operation by the motorman. When the brakes are released, the exhaust air flows from the brake cylinder, through the train line beneath the car body and platform, up to the motorman's brake valve, and thence to the atmosphere. The air that is compressed and forced into the reservoir line and the train line contains more or less moisture and dirt which accumulate in the depressed portions of the pipes beneath the car platforms, since the only outlet is through the elevated motorman's brake valve. The water and dirt accumulating in the portions of the piping beneath the platforms are likely to freeze in cold weather, and interfere with the proper operation of the air brakes.

One of the objects of this invention is to prevent such accumulation of moisture and dirt. This object I attain by locating the motorman's brake valve at the lowest point in the pipe system.

In the embodiment herein illustrated, the motorman's brake valves are located beneath the platforms, so that when the air brakes are released the air with its contained moisture and dirt will be exhausted directly to the atmosphere.

In the accompanying drawings, Figure 1 is a plan view, somewhat diagrammatic, of an air brake system embodying the features of my invention. Fig. 2 is a side elevation of the parts shown in Fig. 1, and illustrating their relation to the floor, platforms and controlling devices. Fig. 3 is a plan view of one form of motorman's brake valve, with parts in section. Fig. 4 is a detail view of one of the elements of said valve. Fig. 5 is a view taken in the plane of line 5 of Fig. 3. Fig. 6 is a view taken in the plane of line 6—6 of Fig. 3.

My invention may be applied to cars of various forms and constructions.

In Fig. 2 I have indicated, in a diagrammatic way, the floor A and the platforms B of an electric street-railway car. 1 represents the reservoir for compressed air, 2 is the reservoir line in communication with the reservoir 1, 3 is the train line, and 4 is the brake cylinder. The reservoir line 2 and the train line 3 may extend longitudinally of the car, as usual. The portions $2^a$ and $3^a$, which extend beneath the platforms B, are in a lower plane than those portions of said pipes which lie beneath the car body.

Any standard or suitable form of engineer's or motorman's brake valve may be employed, but, if desired, the form of valve shown in Fig. 3 may be used. The last mentioned form of motorman's brake valve comprises two structurally independent valves 5 and 6; the valve 5 being located in the reservoir line 2, and the valve 6 being included in the train line 3. The outlet side of the valve 5 is connected to the inlet side of the valve 6 through a pipe 7. Each of the valves 5 and 6 comprises a valve member 8 arranged to be seated by a spring 9. With each valve member 8 is associated a valve stem 10. The valves 5 and 6 are preferably located directly opposite each other and in the same horizontal plane, with the valve stems 9 alined and extending toward each other. To move the valve stems 9 to open the valves, I provide two levers 11 and 12, pivoted at 13 to a suitable fixed support 14. The levers 11 and 12 extend side by side between the ends of the valve stems 10. A sleeve 15 (Fig. 4) is mounted upon a fixed bracket 16. The free ends of the levers 11 and 12 lie at opposite sides of said sleeve and between the flanges 17 and 18 formed on said sleeve. Between said flanges are mounted two anti-friction rollers 19 and 20, one for operating the lever 11, and the other for operating the lever 12. When the sleeve 15 is turned in the direction indicated by the arrow $a$ in Fig. 3, the roller 19 will force or swing the lever 11 outwardly, thereby unseating the valve member 8 of the valve 5, and allowing air to flow from the pipe 2, through the pipe 7, the valve 6, and the pipe 3, to the brake cylinder 4, whereby an application of the brakes is effected. When the sleeve 15 is turned, in the opposite direction, back to the position shown in Fig. 3, the valve member 8 of the valve 5 is closed by its spring 9. When the brakes are to be released, the motorman turns the sleeve 15 in the direction indicated by the arrow $b$, in the course of which movement the roller 20 forces the lever 12 against the valve stem 10 of the valve 6, thereby unseating the valve member 8 of said valve and permitting air to flow from the brake cylinder 4 and the train-line 3 into the exhaust passage 21. Any moisture or dirt that may be moving with the air thus escapes through the exhaust passage; said passage being substantially as low as any other part of the system.

A spring-pressed plunger 22, having a rounded end adapted to engage in notches 23 in the flange 18 of the sleeve 15, serves to indicate to the motorman when the valves 5 and 6 are fully opened and closed.

The sleeve 15 is arranged to be operated by the motorman through the medium of a vertical staff 24, the lower end of which is rigidly attached to said sleeve, said staff extending to a suitable point in the vestibule. To prevent operation of the staff 24 by unauthorized persons, the portion of said staff which is above the platform B may be inclosed within a tube 26. The lower end of the tube may be connected to a flange 27 attached to the platform.

I claim as my invention:

1. In a car, the combination of a car floor and a platform, the platform being below the horizontal plane of the floor; an air-brake pipe extending beneath the floor and the platform, the portion beneath the platform being below the plane of the portion that extends beneath the floor; and a motorman's brake-valve connected to said pipe and located below the platform, said brake-valve comprising an exhaust passage for air and moisture.

2. In a car, the combination of a car floor and a platform, the platform being below the horizontal plane of the floor; an air-brake pipe extending beneath the floor and the platform, the portion beneath the platform being below the plane of the portion that extends beneath the floor; a valve connected to said pipe and located below the platform, said valve having an outlet for air and moisture; and means for operating said valve, said operating means extending upwardly above the platform to a point convenient for operation by the motorman.

3. The combination of a car, a system of air brake pipes extending longitudinally of and beneath the car, a motorman's brake valve located at approximately the lowest point in said system, said valve comprising an exhaust outlet for air and moisture, and means for manually operating said valve.

4. The combination of a car, a system of air-brake pipes extending beneath the car, a motorman's brake-valve located at approximately the lowest point in said system, said valve comprising an exhaust outlet for air and moisture, said outlet being at the lower side of said valve, and means for manually operating said valve.

In testimony whereof I affix my signature in presence of two witnesses.

OSCAR JOHNSON.

Witnesses:
 CARL C. CARLSON,
 GEORGE L. CHINDAHL.